United States Patent
Shifrin

(10) Patent No.: US 8,147,409 B2
(45) Date of Patent: Apr. 3, 2012

(54) METHOD AND APPARATUS FOR TRANSDUCER EXCITATION IN MEDICAL ULTRASOUND IMAGING

(75) Inventor: Lazar A. Shifrin, San Jose, CA (US)

(73) Assignee: SuperTex, Inc., Sunnyvale, CA (US)

( * ) Notice: Subject to any disclaimer, the term of this patent is extended or adjusted under 35 U.S.C. 154(b) by 737 days.

(21) Appl. No.: 12/053,235

(22) Filed: Mar. 21, 2008

(65) Prior Publication Data

US 2008/0242987 A1 Oct. 2, 2008

Related U.S. Application Data

(60) Provisional application No. 60/920,606, filed on Mar. 29, 2007.

(51) Int. Cl.
*A61B 8/00* (2006.01)
(52) U.S. Cl. .......... 600/437; 600/407; 600/443
(58) Field of Classification Search .......... 600/407, 600/437, 443
See application file for complete search history.

(56) References Cited

U.S. PATENT DOCUMENTS

| | | | |
|---|---|---|---|
| 4,794,933 A * | 1/1989 | Yamazaki | 600/455 |
| 5,549,111 A | 8/1996 | Wright et al. | |
| 5,833,614 A | 11/1998 | Dodd et al. | |
| 5,970,025 A | 10/1999 | Cole et al. | |
| 6,104,673 A | 8/2000 | Cole et al. | |
| 6,135,963 A | 10/2000 | Haider | |
| 6,241,676 B1 | 6/2001 | Savord | |
| 6,312,379 B1 | 11/2001 | Bradley et al. | |
| 6,432,055 B1 | 8/2002 | Carp et al. | |
| 6,469,957 B1 | 10/2002 | Savord et al. | |
| 6,537,216 B1 | 3/2003 | Shifrin | |
| 6,595,921 B1 * | 7/2003 | Urbano et al. | 600/437 |
| 7,022,074 B2 * | 4/2006 | Kristoffersen et al. | 600/437 |
| 2004/0254459 A1 | 12/2004 | Kristoffersen et al. | |
| 2005/0033168 A1 * | 2/2005 | Shifrin | 600/437 |
| 2008/0242987 A1 | 10/2008 | Shifrin | |

OTHER PUBLICATIONS

PCT Search Report and Written Opinion mailed on Aug. 1, 2008 in connection with the related PCT Patent Application No. US2008/03872.
EP Supplementary European Search Report dated Apr. 8, 2011, in connection with the related EP Patent Application No. 08 72 7132.
*Fractional/Integer—N PLL Basics*, Texas Instruments, Technical Brief Aug. 1999.

* cited by examiner

*Primary Examiner* — Brian Casler
*Assistant Examiner* — Peter Luong

(57) ABSTRACT

A method of transducer excitation in medical ultrasound imaging. Based on a stepped approximation of Gaussian modulated cosines, the transmit waveform provides bandlimited spectrum and low level of second order harmonics while retaining the duration of the transmitting within two carrier cycles. The waveform is constructed as a linear composition of four unipolar, rectangle pulses of unity amplitude. Furthermore, the described embodiment supports digitally controlled transmit apodization and focusing.

20 Claims, 6 Drawing Sheets

1st (a), 2nd (b), and 3rd (c) Base Waveforms & Their Combining (d, e)

1st (a), 2nd (b), and 3rd (c) Base Waveforms & Their Combining (d, e)

METHOD AND APPARATUS FOR TRANSDUCER EXCITATION IN MEDICAL ULTRASOUND IMAGING

RELATED APPLICATIONS

This patent application claims the benefit of U.S. Provisional Patent Application Ser. No. 60/920,606, filed Mar. 29, 2007 in the name of Lazar A. Shifrin, and entitled "Method and Means for Transducer Excitation in Medical Ultrasound Imaging", which is incorporated herein by reference in its entirety.

TECHNICAL FIELD

This invention relates to medical ultrasound imaging systems, and, in particular, phased array scanners operating in different scan formats and imaging modes, and characteristics of the ultrasonic transmit pulses and transmit pulse generators for such scanners.

BACKGROUND

Generally, characteristics of the transmitted pulse are linked with a particular imaging mode. For example, the duration of the pulse is adjusted depending on whether the scanner operates in B-Mode, Pulsed Wave (PW) Doppler, or Color Flow Imaging. Likewise, the center frequency of the pulse is set according to the frequency response of a transducer.

To improve the propagation characteristics of the sound wave, the interrogating pulse of many medical ultrasonic imaging systems is constituted as a carrier wave modulated by a gradually rising and gradually falling amplitude envelope. In some cases, the envelope of the pulse is Gaussian in shape. Its advantage is that an initially Gaussian pulse retains its Gaussian shape during propagation through an attenuating media such as tissue.

One more reason for shaping transmit pulses has come in conjunction with the harmonic imaging where it is particularly valuable to reduce the level of even harmonics.

Summarizing, both fundamental and sub-harmonic mode ultrasound imaging are all improved by controlling the bandwidth of the frequency spectrum of the transmitted ultrasonic pulse. This bandwidth is preferably limited to frequencies around the fundamental, and is preferably sharply reduced at specified harmonics and sub-harmonics of the fundamental.

Referring to the transmit techniques, there are two main classes of ultrasound transmitters: pulsers and so-called arbitrary waveform generators (AWG).

Arbitrary waveform generators have been advanced solution for high-end ultrasound systems (by way of example, see U.S. Pat. Nos. 5,549,111, 5,970,025, 6,104,673, and 6,469,957). AWGs can provide instantaneous change in transmit energy between transmit pulses, apodization profiles with greater resolution, and acoustic beams with lower harmonic content. Transmit signals produced by an AWG are typically Gaussian or Hamming modulated cosines individually formed for each transducer element. In operation, AWGs use stored digital representations of shaped waveforms, comprising a digital-to-analog converter and a power amplifier (see U.S. Pat. No. 6,537,216) to produce an analog drive signal for the transducer. However, the current implementation of arbitrary waveform transmitters is limited because of its high manufacturing cost, power dissipation and space constraints.

A typical excitation signal produced by a pulser looks like a gated square wave of a desired carrier frequency. The waveform shape or envelope is essentially fixed, and, therefore, not optimal. The only adjustable parameter of a basic pulser is the length of the gate in terms of an integer number of carrier cycles. Advanced pulsers use the pulsewidth modulation (PWM) techniques and operate as described below.

To generate the PWM transmit waveform, the modulating signal is compared with a high frequency sawtooth or triangle waveform that acts as a carrier. The resulting binary signal of the comparator feeds a suitable set of power switches connected to the power supplies. Having low power dissipation, PWM (or class-D) pulsers can be effectively integrated. For the same reason, the PWM pulsers are more preferable in terms of heatsinking. These factors and the relatively low cost of such ultrasound transmit circuits are the forces behind the motivation of their widespread use.

By way of example, U.S. Pat. No. 6,135,963 entitled "Imaging System with Transmit Apodization Using Pulse-Width Variation" describes a method and apparatus for transmit apodization by controlling the duty cycle of the pulse.

U.S. Pat. No. 5,833,614 and No. 6,432,055 discuss several types of PWM transmit waveforms that can be used to approximate a carrier wave modulated by a gradually rising and gradually falling amplitude envelope. Such PWM waveforms include various unipolar sequences having two voltage levels (+V, 0) and bipolar sequences having three voltage levels (+1V, 0, and −1V).

Ultrasound equipment with harmonic imaging capabilities transmits a signal at one frequency and receives the echoes at twice that frequency. A substantial obstacle to using second harmonic imaging with PWM is minimizing transmit energy at the second harmonic frequency. One solution is based on selecting the number of cycles of a carrier frequency that are transmitted in a square wave pulse burst. A greater number of carrier cycles in the burst corresponds to a narrower signal bandwidth. However, any increase in the number of carrier cycles results in a lower range resolution of the system.

Pulse inversion harmonic imaging exploits two pulse bursts with the second burst as an inverse replica of the first one. This routine cancels even order distortion products that are capable of masking a valuable harmonic information generated by tissue. However, the alternation halves the image update rate. On the contrary, operating at higher frame rates is particularly important for cardiac imaging.

Yet another approach is to use a bipolar (3-state) uniform square wave pulse train, which has less energy around the second harmonic frequency than does a unipolar uniform square wave pulse train of the same length.

To suppress energy at second order harmonics further, U.S. Pat. No. 5,833,614 teaches the transmit waveform comprising pairs of identical pulses. The width of the pulses within each pair is modulated as a function of the envelope amplitude. These pulses are phase delayed by 90 degrees relative to each other. However, increasing the number of alteration in a waveform results in higher sampling rate and, generally, a more complex transmit beamformer. At the same time, while the second harmonic is substantially suppressed, the intensity of the odd harmonics is noticeable. For instance, referring to U.S. Pat. No. 5,833,614, the third harmonic level is approximately −4 dB.

An alternative 3-state, pulse width modulated, bipolar waveform is disclosed by U.S. Pat. No. 6,432,055. This pulse train is constructed by summing a first component with an inverted, time-shifted version of the first component. As shown in U.S. Pat. No. 6,432,055, by properly selecting the time interval for the time shift of the second component, filtering of the second harmonic can be obtained. At the same time, the filtered pulse spectrum is broadband including high-order harmonics and sub-harmonics of the fundamental, each of a considerable intensity.

Therefore, there is still a need for improved transmit sequences that are band-limited and suppress energy at selected harmonic frequencies, and for transmit generators that are capable of generating such sequences.

SUMMARY

By way of introduction, the present invention includes a method and an apparatus for ultrasound transmit excitation.

The present invention may provide a transmit waveform that is characterized by essentially bandlimited spectrum and low level of second order harmonics.

The present invention may also provide a new ultrasound transmitter that outperforms the prior art by simplicity, versatility, lower cost, and higher power efficiency, while maintaining programmability for carrier frequency, transmit beamforming and apodization profile.

In a first aspect, the transmit waveform represents a stepped approximation of Gaussian modulated cosines. The transmit waveform is constructed as a linear composition of four unipolar, rectangle pulses of a unity amplitude. By properly selecting the width of the pulses and their timing relationship, the transmit waveform spectrum shape is close to a Gaussian while all even harmonics are filtered out. In amplitude terms, the transmit waveform has four voltage levels, namely, +2V, +1V, 0, −1V. The zero-mean transmit waveform spans over two carrier cycles.

In the second aspect, transmit beam formation is supported by controlling the time at which the excitation is initiated.

In the third aspect, sampling is occurred at a rate 8 times the predetermined carrier frequency.

Further aspect and advantages of the invention are discussed below in conjunction with the described embodiments.

BRIEF DESCRIPTION OF THE DRAWINGS

The invention will be described with respect to particular embodiments thereof referring to the following drawings:

In FIG. 1, time is measured in units of fractions of the period, $T_0$, of the fundamental (or carrier) frequency $F_0$.

DETAILED DESCRIPTION

The following sections will first discuss an improved ultrasonic transmit sequence that represents a stepped approximation of Gaussian modulated cosines and will then discuss different transmitters for generating such signals.

Transmit Waveforms

Typically, in order to generate a pulsewidth modulation (PWM) transmit sequence, the envelope of an amplitude-modulated waveform is first sampled at a plurality of points. The number of points sampled depends on the sampling frequency, $F_S$, and the duration of the envelope, $T_E$. Preferably, $F_S = M \cdot T_E$, where M is the number of samples. Lowering the value of M results in fewer pulses in the PWM transmit pulse train and, generally, a less complex transmit beamformer. In any case, the width of each pulse is proportional to the amplitude of the envelope at the sampling point. Thus, the duration of the pulses increases gradually to a maximum value and then decreases gradually like the amplitude of the envelope.

To reduce the transmitter complexity and manufacturing cost, the PWM transmit sequence is rather coarsely sampled, such as at a rate of eight or even four samples per carrier cycle. Thus, in order to eliminate possible aliasing effects, the signal to be sampled should be limited in spectral content. Consequently, the original PWM transmit waveform includes at least two carrier cycles.

Implementing a relatively short PWM transmit waveform, an ultrasound system would provide a satisfactory range resolution. However, such a waveform has a high second harmonic content. Thus, with the exception of using a pulse-inversion technique, a traditionally composed PWM transmit sequence is not suitable for harmonic imaging. As previously discussed, various filtering techniques allow suppression of the second harmonic distortion. However, this results in a higher sampling rate, widens the transmit spectrum, and might increase the intensity of the odd harmonics.

Figure 1:
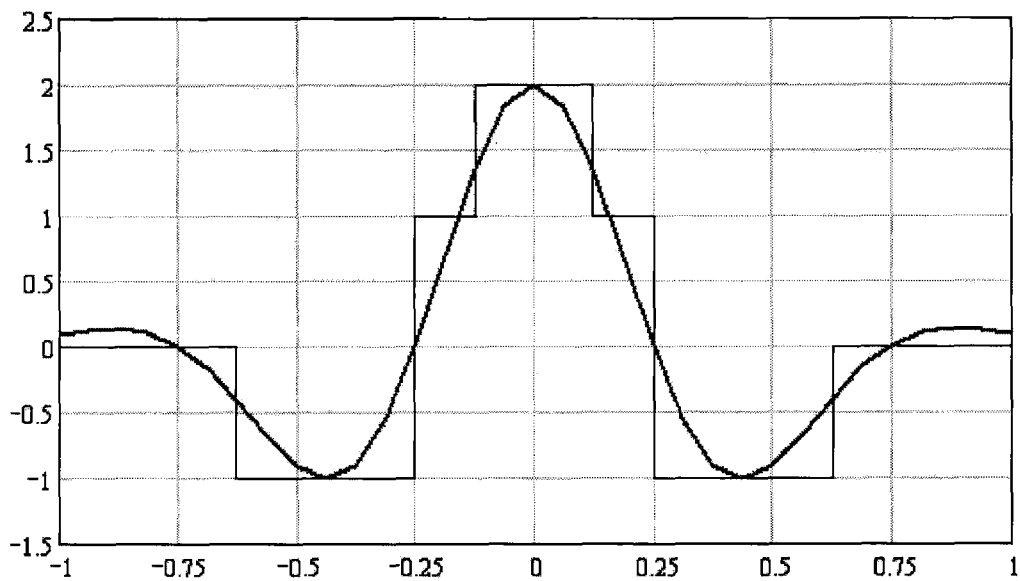
FIG. 1 depicts a preferred transmit waveform (mathematically described as Gaussian modulated cosines) and a stepped approximation of said waveform.
Figure 3A:
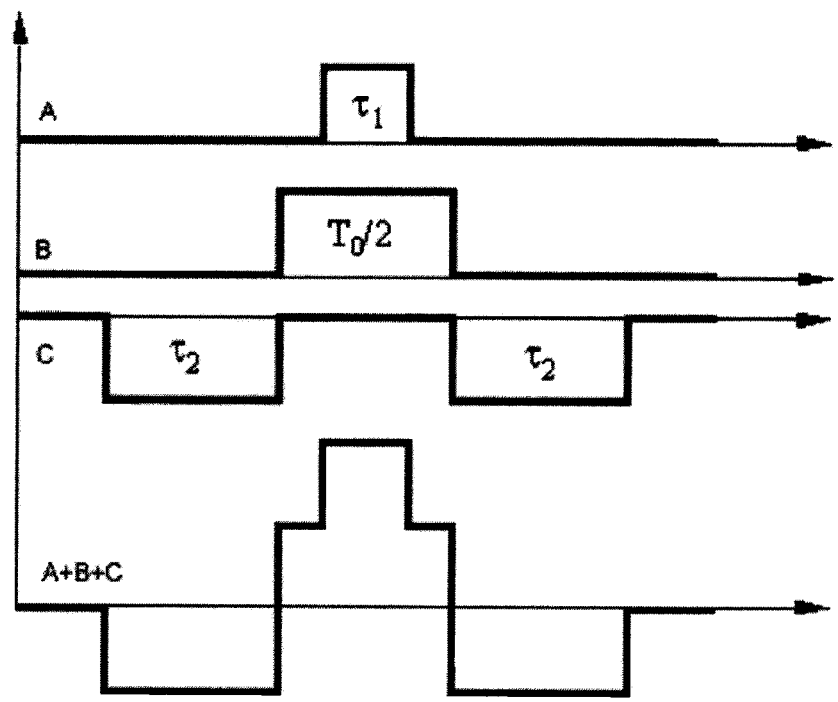
FIG. 3a and FIG. 3b depict two alternative embodiments of constructing of a stepped approximation of the Gaussian modulated cosines of FIG. 1.
Figure 3B:
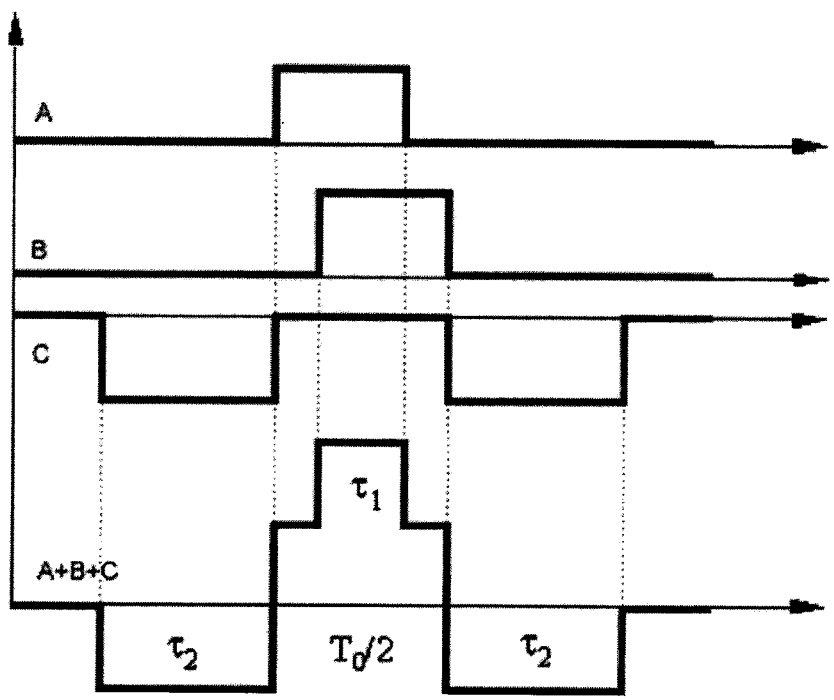

In the present invention, synthesis of an improved transmit pulse train involves a stepped approximation of Gaussian modulated cosines as shown in FIG. 1. Then, the step-approximated transmit waveform of FIG. 1 is decomposed into three base pulse sequences as depicted as A, B, C and A+B+C in FIG. 3a. An alternative but equivalent transmit waveform partition is shown in FIG. 3b. The base waveforms A and B in FIGS. 3a and 3b are unipolar in that the polarity of two or more pulses is the same (e.g., positive or negative) regardless of the amplitude. The pulse train C comprises two unipolar unity amplitude rectangle pulses. The polarity of C is inverted with respect to A or B. Both partitions satisfy the following basic requirements:

The coupling between ultrasonic transmitters and transducers may be provided by a transformer, in one embodiment, or a capacitor, in another embodiment, and, thus, no DC component in the transmit waveform is expected. Referring to FIG. 3a, this condition can be achieved if a voltage-time product of positive (A+B) and negative (C) pulse trains are equal. With unity amplitude rectangular pulses, the voltage-time product yields:

$$\tau_1 = 2 \cdot \tau_2 - T_0/2 \tag{1}$$

where the time $T_0$ is the period of the fundamental frequency $F_0$, the time $\tau_1$ is the duration of a pulse exhibited in the A pulse train, the time $\tau_2$ is the duration of pulses presented in the C pulse train.

The spectrum, $S_0(f)$, of a unity amplitude rectangular pulse having a duration of $\tau$ is given by:

$$S_0(f) = \frac{\sin(\pi \cdot f \cdot \tau)}{\pi \cdot f} \quad (2)$$

where f is the frequency variable.

Thus, the spectrums of the base sequences A, B, and C can be expressed as:

$$S_A(f) = \frac{\sin(\pi \cdot f \cdot \tau_1)}{\pi \cdot f} \quad (3)$$

$$S_B(f) = \frac{\sin(\pi \cdot f \cdot T_0/2)}{\pi \cdot f} \quad (4)$$

$$S_C(f) = \frac{\sin(\pi \cdot f \cdot T_0/2)}{\pi \cdot f} - \frac{\sin[\pi \cdot f \cdot (2 \cdot \tau_2 + T_0/2)]}{\pi \cdot f} \quad (5)$$

Substituting Equation 1 in Equation 3 yields:

$$S_A(f) = \frac{\sin[\pi \cdot f \cdot (2 \cdot \tau_2 - T_0/2)]}{\pi \cdot f} \quad (6)$$

Summing Equations (4), (5), and (6), the frequency spectrum of the step-approximated transmit waveform, $S_\Sigma(f)$ is:

$$S_\Sigma(f) = S_A(f) + S_B(f) + S_C(f) \quad (7)$$
$$= \frac{2\sin(\pi f T_0/2)}{\pi f} \cdot [1 - \cos(2\pi f \tau_2)]$$

In particular, the fundamental frequency peak is located at $f=F_0=1/T_0$. Substituting $f=F_0$ into Equation 7, the peak value yields:

$$S_\Sigma(F_0) = \frac{2T_0}{\pi} \cdot \left[1 - \cos\left(2\pi \frac{\tau_2}{T_0}\right)\right] \quad (8)$$

Referring to Equation 7 again, the even harmonics are even multiples of the fundamental. Thus, the even harmonics frequencies, $F_{2n}$, can be determined as $F_{2n}=2nF_0=2n/T_0$, where n=1, 2, 3, etc. Inserting $f=F_{2n}$ into the argument of the sine function of expression (7) yields $\sin(\pi fT_0/2)=\sin(\pi n)=0$. Therefore, satisfying Formula 1, the spectrum of the transmit waveform of FIG. 3a contains no even harmonics.

The techniques of the present invention may allow suppressing a range of frequencies adjacent to the second harmonic. To confirm this analytically, it is noted that the term in square brackets of Equation 7 is zeroed if the cosine argument is equal to $2n\pi$. This occurs at the frequencies $f=F_{ABSORPTION}(n)$ satisfying the condition $2\pi f\tau_2=2n\pi$. Thus, $F_{ABSORPTION}(n)=n/\tau_2$. For example, by selecting $\tau_2=3T_0/8=3/8F_0$, absorption lines of the transmit spectrum are given by:

$$F_{ABSORPTION}(n) = \frac{8nF_0}{3} \quad (9)$$

Figure 2:
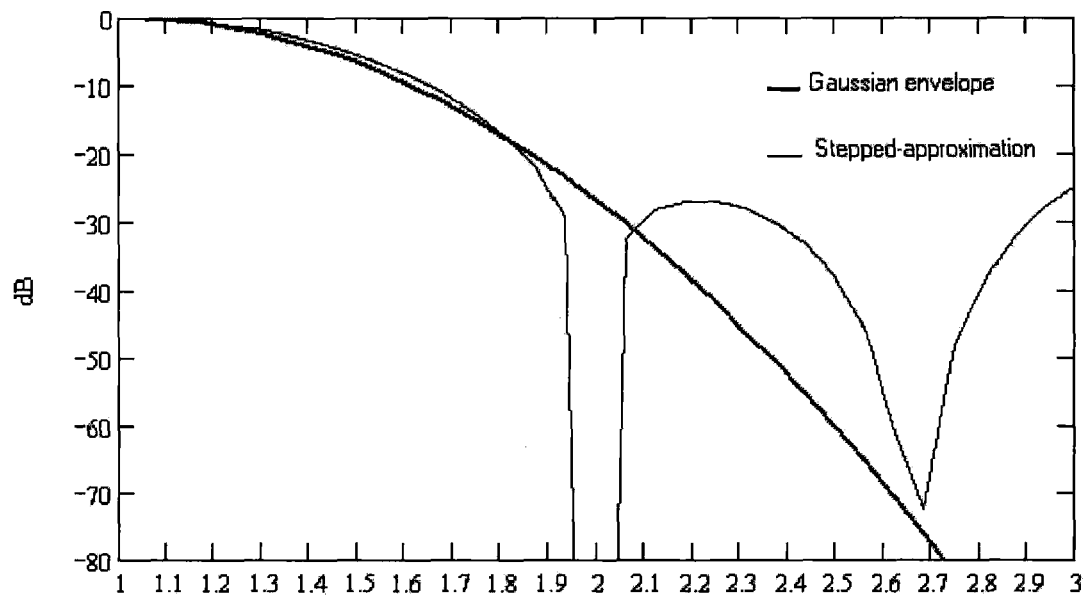
FIG. 2 depicts spectrums, which are associated with the waveforms of FIG. 1.

As shown in FIG. 2, the first absorption line is located at $F_{ABSORPTION}(1)=8F_0/3\approx2.7 \cdot F_0$. Thus, the transmit sequence at the present invention may provide bandlimited spectrum and good range resolution. Furthermore, its spectrum comprises no second order harmonics of the fundamental.

The method of generating an ultrasonic transmit waveform is illustrated by the graphs of FIGS. 5a through 5e, in which time is plotted on the X-axis and voltage on the Y-axis. Time is measured in units of fractions of the period, $T_0$, of the fundamental frequency $F_0$. A first, second, and third unipolar base waveforms of unity amplitude having the above-defined temporal characteristics are respectively shown in the graphs of FIGS. 5a through 5c. To provide a zero-DC transmit waveform, the first base waveform is inverted as shown in the graph of FIG. 5d. Then, the inverted first, second, and third base waveforms are summed providing the proposed approximation of Gaussian modulated cosines as depicted in the graph of FIG. 5e.

In an alternative embodiment, the transmit waveform can be arranged by first summing the second and third base waveforms and subsequent subtracting the first base waveform from the obtained sum.

Low-Distortion Ultrasound Transmitter

Figure 4:
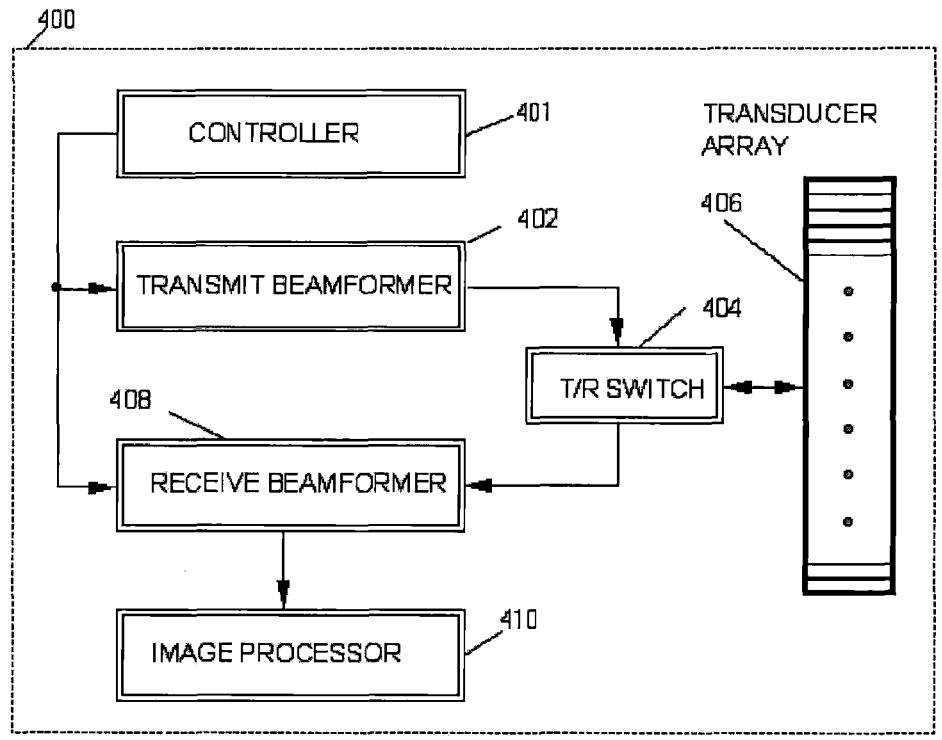
FIG. 4 is a block diagram illustrating a conventional ultrasonic imaging system operative to implement the present invention.

FIG. 4 is a block diagram illustrating a medical ultrasonic imaging system 400. The system 400 comprises a controller 401, a multi-channel transmit and receive beamformers (402 and 408, respectively), a plurality of transmit/receive (T/R) switches 404, an array of transducers 406, and an image processor 410.

The insonification of a body structure is provided by the transmit beamformer 402 that applies respective transmit waveforms via the transmit/receive (T/R) switches 404 to the transducer array 406 in response to the controller 401. (Although the imaging system 400 is described for transmitting waveforms to and receiving waveforms from a body structure, the imaging system and the elements thereof may be used with other structures and in other systems.)

Each channel of the transmit beamformer 402 comprises a transmitter and a source of sampled waveform information representative of the desired transmit waveform. To steer and focus the transmit beam at a particular focal position, the transducers 406 are to be excited with different time delays. This is achieved by applying per-channel delay to the desired transmit waveform. Further details on beamforming can be found in foregoing section.

During receive, the transducers 406 detect echoes from body structures. The receive waveforms are applied via the transmit/receive switches 404 to a multi-channel receive beamformer 408, which applies suitable delays and filters to create a coherent sum for selected points along the spatial axis for application to an image processor 410 in response to the controller 401.

Figure 6:
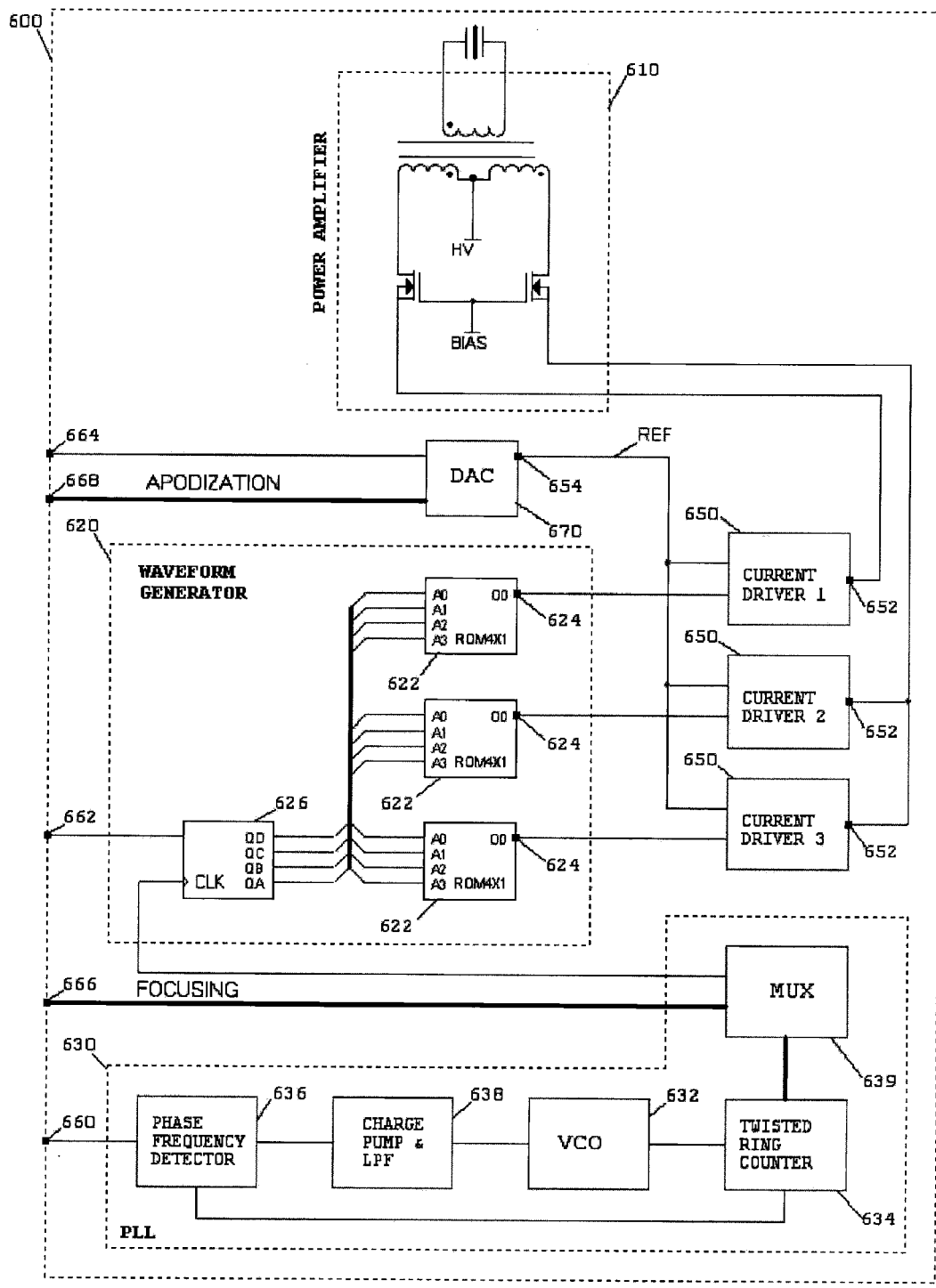
FIG. 6 is a block diagram of an embodiment of an ultrasound transmitter suitable for implementation with the imaging system of FIG. 4.

FIG. 6 is a block diagram illustrating a first embodiment of a single transmit channel transmitter 600 capable of being incorporated into the beamformer 402 for providing the beamforming of the present invention. The transmitter 600 comprises a power amplifier 610, a waveform generator 620, a phase-locked loop (PLL) 630, three programmable current drivers 650, and a digital-to-analog converter (DAC) 670. In one embodiment, the programmable current drivers 650 are identical. The interface of the transmitter 600 comprises a clock terminal 660, a triggering terminal 662, a reference voltage input 664, and two command ports, 666 and 668, responsive to receive beam formation data (focusing and apodization, respectively) in a digital format.

Figure 5:
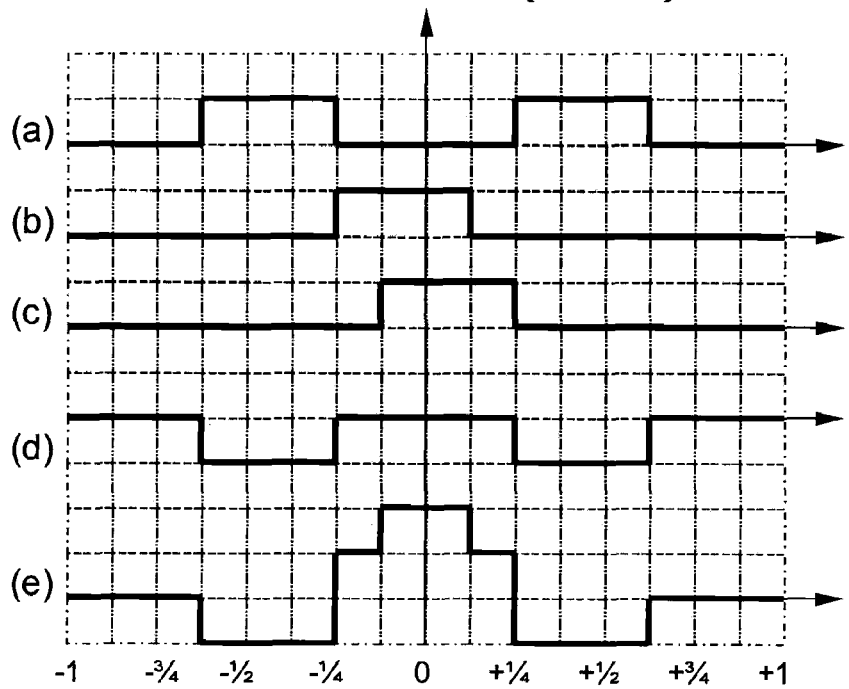
FIGS. 5a through 5e illustrate timing diagrams of the operation of the waveform generator.

The power amplifier 610 may be a conventional transformer-coupled class B push-pull transistor amplifier. The transistors of the power amplifier 610 operate in a common-gate (or common-base) mode providing essentially low input impedance at their sources (or emitters). The current drivers 650 feed the power amplifier 610 via respective outputs 652. A low input impedance of the amplifier 610 enables direct summing of two currents provided by those drivers 650 responsible for the second and third base waveforms (waveforms 5b and 5c, respectively,) as shown in FIG. 5.

The phase locked loop 630 includes a voltage controlled oscillator (VCO) 632, a frequency divider 634 (such as a twisted ring counter) for frequency-dividing an output from the VCO 632, a phase-frequency detector 636 for comparing an output from the frequency divider 634 with a phase of an external reference signal applied via the clock terminal 660, a charge pump and filter 638 for controlling the oscillator frequency of the VCO 632 on the basis of an output from the phase frequency detector 636, and a multiplexer 639 for selecting a phase of the oscillator frequency. In one embodiment, the frequency divider 634 comprises a $2^{N-1}$-stage (N is an even integer) twisted ring counter providing $2^N$ phase-shifted clock lines from inverted and non-inverted outputs, which are sequentially coupled to the inputs of the multiplexer 639 in ascending order of the value of phase shift.

The waveform generator 620 includes three blocks 622, one for the base waveforms, and an address counter 626. Each of the blocks 622 stores a 4-bit length binary word (i.e., 16 in decimal) as depicted in FIG. 5. (A 4-bit length binary word is for illustrative purposes. Other numbers of bits may be used.) When a block 622 is read with an $8 \times F_0$ clock, the resulting sequence defines a waveform having $2T_0$ in duration. To generate the first, second, and third base waveforms synchronously with a phase-shifted reference clock, the address counter 626 is fed by the multiplexer 639. The process of firing is initiated via the triggering terminal 662. The base waveforms are outputted through data ports 624 and respectively applied to the current drivers 650.

The DAC 670 is controlled by a digital code loaded into the port 668. Accordingly, the DAC output 654 becomes a product of a voltage applied to the reference input 664 and the digital code. Thus, the DAC 670 generates a scaled voltage in response to a code provided by the command register.

Figure 8:
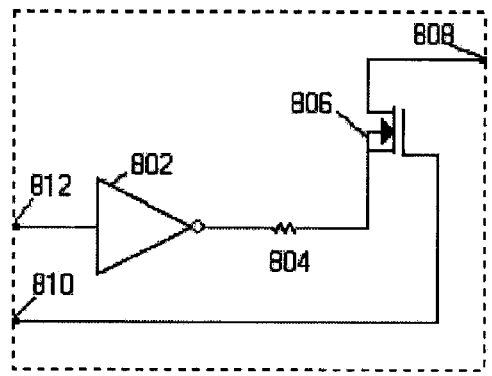
FIG. 8 is a schematic diagram of an embodiment of the current driver of the ultrasound transmitter of FIG. 6.

FIG. 8 is a circuit diagram illustrating the ON/OFF switchable current driver 650 shown in FIG. 6. The current driver 650 comprises a logical inverter 802 having an open-drain output 808, a resistor 804, and a MOSFET transistor 806 having a gate, drain and source. The transistor source is coupled to the open-drain output through the resistor 804. Referring to FIG. 6, the transistor gate 810 is fed by the DAC output 654. In an alternative embodiment, a bipolar transistor in a common base configuration may be used. Regardless on the implementation, the current flowing through the resistor 804 in the ON state is proportional to the DAC output voltage denoted as REF in FIG. 6. Signals for controlling ON-OFF states of the current driver 650 are produced by the waveform generator 620 (FIG. 6) and applied to the inverter input 812.

For low levels of the DAC output, the threshold voltage tolerance of the transistor 806 may degrade the accuracy of apodization. In view of that, the second embodiment shown in FIG. 7 provides a modified transmitter architecture.

Figure 7:
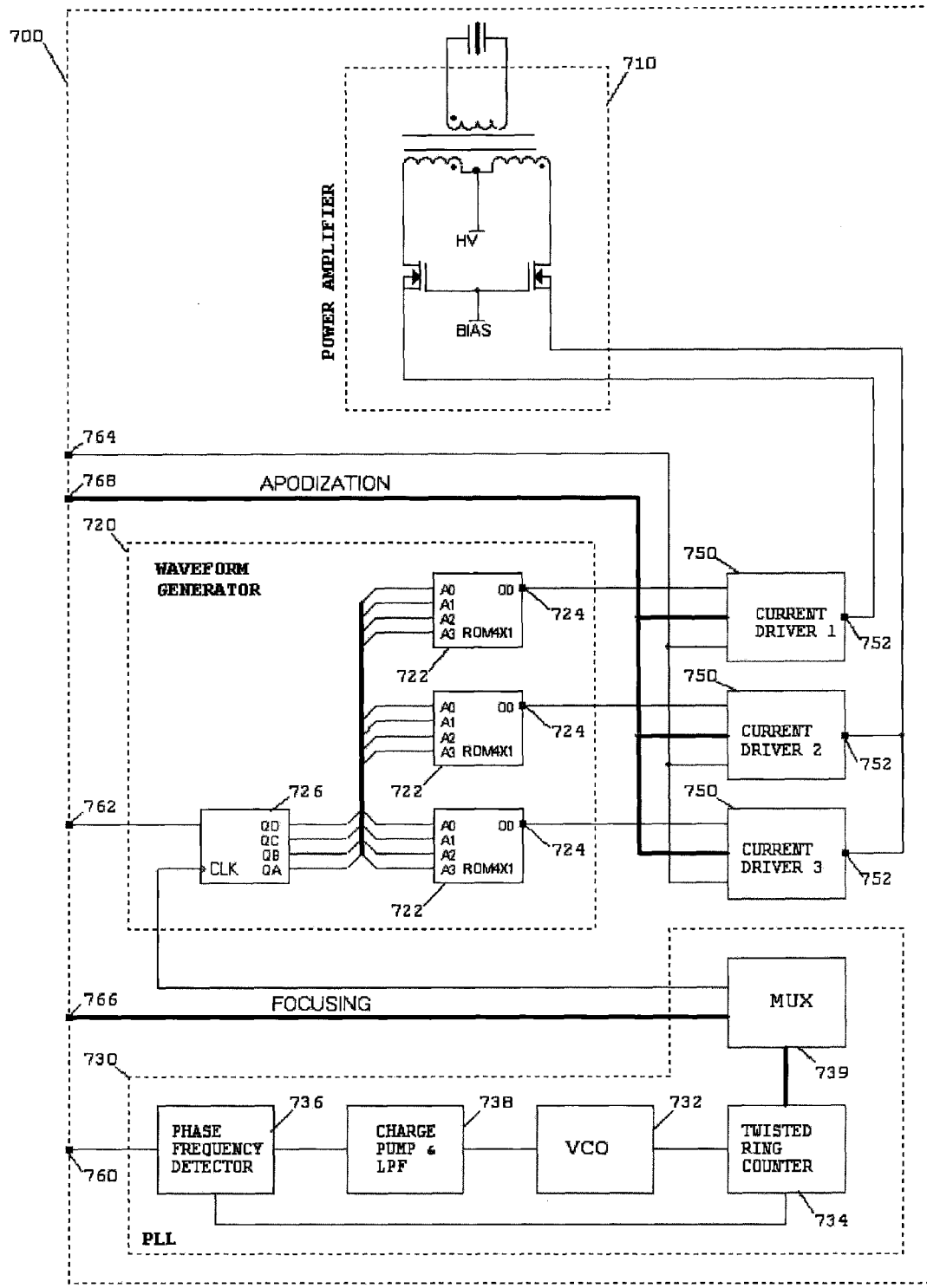
FIG. 7 is a block diagram of another embodiment of an ultrasound transmitter suitable for implementation with the imaging system of FIG. 4.

FIG. 7 is a block diagram illustrating a second embodiment of a single transmit channel transmitter 700 capable of being incorporated into the beamformer 402 for providing the beamforming of the present invention. The transmitter 700 comprises a power amplifier 710, a waveform generator 720, and a PLL 730, which are identical to the respective elements 610, 620, and 630 shown in FIG. 6. Similarly, the interface of the second embodiment includes a clock terminal 760, a triggering terminal 762, a reference input 764, and two command ports, 766 and 768. The difference between the above embodiments lies in the arrangement of current drivers 750.

Figure 9:
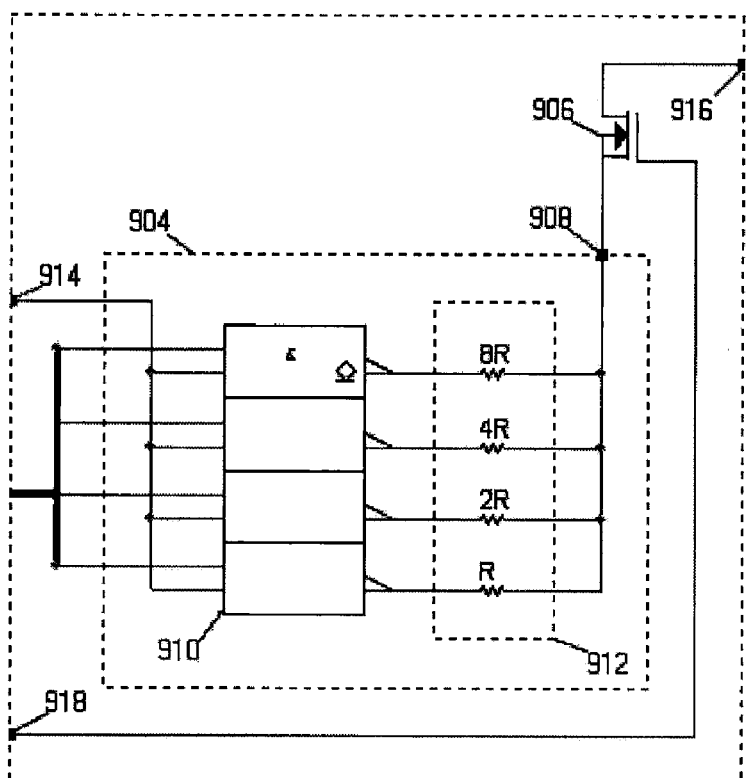
FIG. 9 is a schematic diagram of an embodiment of the current driver of the ultrasound transmitter of FIG. 7.

FIG. 9 depicts a circuit diagram of the current driver 750 shown in FIG. 7. The programmable current driver 750 comprises a digitally programmable resistor (DPR) 904 with enable and a MOSFET transistor 906. The transistor 906 is arranged with its gate 918 coupled to the reference input 664, the source coupled to a common node 908 of the programmable resistor 904, and the drain to providing the driver output 916. The programmable resistor 904 comprises a plurality of 2-input open-drain NAND gates 910 and a plurality of resistors 912. The resistors 912 are binary weighted. Each resistor 912 is coupled between the open-drain output of a gate 910 and the common node 908. A first input of each gate receives a respective bit of a binary word applied to the command port 668. This binary word represents a desired resistance of the programmable resistor 904.

All second inputs of each gate are coupled together exhibiting a node 914 and, thus, a logical "1" applied to the node enables conducting of the gates having a logical "1" on their first inputs. Therefore, the transistor 906 generates a current pulse whose timing is determined by the waveform generator 720. In an alternative embodiment, thermometer coding scheme or its combination with binary techniques may be used. The amplitude of this pulse may be directly proportional to the reference signal and inversely proportional to the resistance.

Referring to FIG. 9, programmable resistance is varied from 8R/15 to 8R. Thus, for a fixed voltage at the gate of the transistor 906, the amplitude of the produced current pulses will approach the range of 24 dB. Other dynamic ranges, including lesser or larger ranges may be used. By any means, this range defines attainable amplitude resolution for apodization.

Beamforming

The two most common beamforming approaches are the time delay (shift) and phase shift. The time delay approach allows focusing and steering the beam by introducing per-channel time delays that are independent from the operating frequency and bandwidth. Instead of applying true time delays for each channel, the phase shift beamformer converts a required delay to an equivalent phase shift at a specified frequency. Since a phase-shift technique is adapted to form a beam at a predetermined frequency, the respective imaging systems are more narrowband than those employing time-delay beamformers.

An absolute time shift may be implemented by delaying the composed waveform or delaying a start of waveform generation. To delay the composed waveform, transmit beamformers may use field programmable gate arrays (FPGA) or first-in, first-out (FIFO) buffers for each channel. Delaying a start point of waveform generation is also provided on a per-channel basis but it consumes much less hardware resources.

Implementing the second method of the time shift, the absolute delay is programmed into the programmable delay counter. This counter counts a number of clock cycles associated with the absolute delay in response to a start-of-transmit signal (SOT). A transmit sequence is initiated at the end of the counting period. Thus, the accuracy of delay is defined by the counter clock rate.

Those experienced in the art understand that routing a plurality of highly sampled (e.g., broadband) SOT signals might be complex. For this reason, one embodiment of the present invention is described such that the applied SOT signal is produced with a $T_0/8$ sampling interval (a 45° sampling in terms of phase), e.g., an ultrasound system incorporating the present invention would responsible for merely coarse focusing.

To support fine focusing, the implemented PLLs 630 and 730 are configured to produce N (N is an even integer) phase-shifted clocks at the $8F_0$ rate. Thus, the phases of these clocks are evenly spaced within the 45° range. One of the above clocks is selected by the multiplexers 639 and 739 and used for timing the waveform generators 620 and 720. Consequently, the transmit waveforms may have N discrete positions relative to the one determined by the applied "coarse" SOT (or triggering) signal. Since the adjacent discrete positions are shifted in time by $T_0/8N$, the beamformer phase resolution yields 45°/N in phase. For instance, implementing an 8-stage twisted ring counter, a 2.8° phase accuracy can be achieved.

Some features of the above embodiments of the present invention can be summarized as follows:
1. The transmit waveform may be characterized by bandlimited spectrum and low level of second order harmonics while retaining the duration of the transmitting within two carrier cycles.
2. The ultrasound transmitters support digitally controlled transmit apodization and fine focusing.
3. The embodiments may provide time-independent output impedance.

While the invention has been described above by reference to various embodiments, it would be understood that many changes and modifications could be made without departing from the scope of the invention. For example, different waveform generators, current drivers, switches, or output amplifier configurations may be used. It is therefore intended that the foregoing detailed description be understood as an illustration of the presently preferred embodiments of the invention, and not as a definition of the invention. It is only the following claims or added claims, including all equivalents, are intended to define the scope of this invention.

What is claimed is:

1. A method of transducer excitation in a medical ultrasound imaging system having a waveform generator and a transducer, the method comprising the steps of:
(a) generating by the waveform generator an excitation waveform signal with three base waveforms (A, B, C), each of which is a unipolar pulses, wherein the waveform signal represents a gated, stepped approximation of a Gaussian envelope multiplied by a cosine carrier signal, with said three base waveforms satisfying the relationships of:
voltage-time product of positive (A+B)=negative C, where C comprises two pulses having the same duration;
$t_1 = 2*t_2 - T_0/2$, where $t_1$ is the duration of the A pulse, $t_2$ is the duration of each of the pulses of C, and $T_0/2$ is the duration of the B pulse and $T_0$ is the fundamental frequency;
(b) selecting a carrier frequency signal, $F_0$, in accordance with a fundamental frequency of the transducer, $F_0 = 1/T_0$; and
(c) applying the excitation waveform signal to the transducer.

2. The method of claim 1 wherein the step (a) further comprises constructing the excitation waveform within an excitation interval of $2 T_0$.

3. The method of claim 1 wherein the step (a) further comprises constructing the excitation waveform as a bipolar waveform.

4. The method of claim 1 wherein the step (a) further comprises constructing the excitation waveform as a zero-DC waveform.

5. The method of claim 1 wherein the step (a) further comprises synthesizing the excitation waveform to have no even harmonic content.

6. The method of claim 1 wherein the step of constructing an excitation waveform includes a step of combining said base waveforms, said combining step further comprises inverting of the polarity of the first waveform.

7. A method of transducer excitation in a medical ultrasound imaging system having a waveform generator and a transducer, the method comprising the steps of:
(a) generating by the waveform generator an excitation waveform signal with three base waveforms (A, B, C), each of which is a unipolar pulse, wherein the waveform signal represents a gated, stepped approximation of a Gaussian envelope multiplied by a cosine carrier signal, with said three base waveforms satisfying the relationships of:
voltage-time product of positive (A+B)=negative C, where C the first base waveform comprises first and second pulses having the same duration of $T_1 = 0.375 T_0$;
wherein said second base waveform (A) and said third base wave form (B) has the same duration with the center of said second base waveform (A) shifted from the center of said third base waveform (B);
(b) selecting a carrier frequency signal, $F_0$, in accordance with a fundamental frequency of the transducer, $F_0 = 1/T_0$; and
(c) applying the excitation waveform signal to the transducer.

8. The method of claim 7 wherein said first and second pulses of said first base waveform are unipolar and characterized by a uniform amplitude.

9. The method of claim 7 wherein the second pulse of said first base waveform
is shifted from the first pulse in time, said shift is equal to $T_0/2$;
and wherein the center of said first base waveform is over the center of the excitation interval.

10. The method of claim 7 wherein the second and third base waveforms are unipolar, uniform amplitude pulses having duration of $T_1 = 0.375 T_0$; and
wherein the center of the second base waveform (A) is shifted $T_0/16$ in time from the center of the excitation interval in the backward direction; and
the center of the third base waveform (B) is shifted $T_0/16$ in time from the center of the excitation interval in the forward direction.

11. An ultrasound transmitter for generating an excitation waveform with programmable apodization and time (phase) shift, the transmitter comprising:
a phase locked loop (PLL) generating a clock signal with user-selectable phase shift in response to a reference clock having a frequency $8 \times F_0$, where $F_0$ is a fundamental frequency of the transducer;
a waveform generator having a plurality of waveform outputs for providing respective waveforms in response to a trigger signal and the clock signal, and constructing an excitation waveform, with three base waveforms (A, B, C), each of which is a unipolar pulse, with said three base waveforms satisfying the relationships of:
voltage-time product of positive (A+B)=negative C, where C comprises two pulses having the same duration;
wherein the waveform represents a gated, stepped approximation of a Gaussian envelope multiplied by a cosine carrier; selecting the carries frequency, $F_0$, in accordance with a fundamental frequency of the transducer;

first, second and third programmable current drivers each having a waveform input and having a current output, and providing current signals from the current output in response to a voltage reference and a respective waveform applied to a corresponding waveform input from a corresponding waveform output of the waveform generator;

a power amplifier for generating an excitation waveform in response to current signals on the current outputs of the current drivers; and a first and second command registers controlling said apodization factor and time (phase) shift of the excitation waveform.

12. The ultrasound transmitter of claim 11, wherein:

the waveform generator stores and reads the first, second and third base waveforms via a first, second and third data ports, said waveform generator comprises a 3×16 addressable matrix of binary data and a 4-bit address counter which maintains said addressing, and wherein:

said counter further comprises timing and firing inputs, said timing and firing inputs are respectively coupled to a multiplexer output and a triggering terminal.

13. The ultrasound transmitter of claim 11, wherein the power amplifier is a transformer-coupled class B push-pull amplifier comprising first and second high-voltage transistors, each of said first and second high-voltage transistors having a gate, source, and drain, both transistors coupled in a common-gate configuration, and wherein the source of the first high-voltage transistor is coupled to the current output of the first current driver, the source of the second high-voltage transistor and the current outputs of said second and third current drivers are coupled together.

14. The ultrasound transmitter of claim 11, wherein the PLL includes a voltage controlled oscillator (VCO), a frequency divider for frequency-dividing an output from the VCO, a phase-frequency detector for comparing an output from the frequency divider with a phase of said reference clock, a charge pump for controlling the VCO frequency on the basis of an output from said phase detector, and a multiplexer and wherein said frequency divider comprises a $2^{N-1}$-stage (N is an even integer) twisted ring counter providing $2^N$ phase-shifted clock lines from inverted and non-inverted outputs, which are sequentially coupled to the inputs of said multiplexer in ascending order of the value of phase shift, said multiplexer having $2^N$ inputs, an output providing said clock signal and a select port coupled to said first command register.

15. The ultrasound transmitter of claim 11, wherein each of said first, second and third current drivers further comprises a low-voltage transistor, said transistor having a gate, a source, and a drain supplying the current driver output, the gates of said low-voltage transistors of the first, second and third current drivers being coupled together with the reference voltage source.

16. The ultrasound transmitter of claim 15, wherein each of said first, second and third current drivers further comprises a logical inverter and a resistor, said logical inverter having an input node and an open-drain output, said resistor coupled between said open-drain output and the source of said low-voltage transistor, said input nodes are respectively coupled to the first, second and third data ports of said waveform generator.

17. The ultrasound transmitter of claim 15, wherein said reference voltage source comprises a digital-to-analog converter (DAC) arranged to generate a scaled voltage in response to a code provided by the second command register.

18. The ultrasound transmitter of claim 15, wherein each of said first, second and third current drivers further comprises a plurality of binary weighed resistors, each having two terminals, and a plurality of NAND gates, each having two inputs and an open-drain output.

19. The ultrasound transmitter of claim 18, wherein:

the first terminals of said resistors are respectively coupled to the open drain outputs of said NAND gates;

the second terminals of said resistors are coupled together with the source of said low-voltage transistor; and the first inputs of said NAND gates are coupled to corresponding bit lines of the second command register.

20. The ultrasound transmitter of claim 19, wherein the second inputs of the NAND gates of said first, second and third current drivers are respectively coupled to the first, second and third data ports of said waveform generator.

* * * * *